United States Patent
Hu et al.

(10) Patent No.: US 12,401,894 B1
(45) Date of Patent: Aug. 26, 2025

(54) BIRD PHOTOGRAPHING METHOD AND BIRD FEEDER

(71) Applicant: NETVUE TECHNOLOGIES CO., LTD., Shenzhen (CN)

(72) Inventors: Youle Hu, Shenzhen (CN); Yucheng Ren, Shenzhen (CN); Rui Zhang, Shenzhen (CN); Chuan Chen, Shenzhen (CN)

(73) Assignee: NETVUE TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/785,833

(22) Filed: Jul. 26, 2024

(30) Foreign Application Priority Data

Feb. 28, 2024 (CN) .......................... 202410221757.7

(51) Int. Cl.
*H04N 23/65* (2023.01)
*A01K 29/00* (2006.01)
*A01K 39/012* (2006.01)
*H04N 23/60* (2023.01)
*H04N 23/61* (2023.01)
*H04N 23/695* (2023.01)

(52) U.S. Cl.
CPC .......... *H04N 23/64* (2023.01); *A01K 29/005* (2013.01); *A01K 39/012* (2013.01); *H04N 23/61* (2023.01); *H04N 23/695* (2023.01)

(58) Field of Classification Search
None
See application file for complete search history.

(56) References Cited

U.S. PATENT DOCUMENTS

| | | | |
|---|---|---|---|
| 10,796,141 B1* | 10/2020 | Shepherd, Jr | G06V 10/751 |
| 2009/0288607 A1* | 11/2009 | Held | A01K 39/0113 |
| | | | 119/51.01 |
| 2012/0287144 A1* | 11/2012 | Gandhi | G09G 3/2029 |
| | | | 345/589 |
| 2013/0201344 A1* | 8/2013 | Sweet, III | H04N 1/00183 |
| | | | 348/169 |
| 2014/0333718 A1* | 11/2014 | Chang | H04N 23/64 |
| | | | 348/36 |
| 2016/0189749 A1* | 6/2016 | Rav-Acha | A61B 5/1128 |
| | | | 386/278 |
| 2019/0117379 A1* | 4/2019 | Quirós | A61F 2/12 |
| 2020/0058101 A1* | 2/2020 | Omori | H04N 23/6815 |
| 2021/0368094 A1* | 11/2021 | Li | G06N 20/00 |

(Continued)

*Primary Examiner* — Edemio Navas, Jr.

(57) ABSTRACT

The present invention discloses a bird photographing method, a readable storage medium, an electronic device and a bird feeder, wherein: a bird approaching and staying on the feeding tray is detected, and a photographing mechanism photographs the bird and judges the pre-composition; if the pre-composition is determined to conform to composition rules, the bird is determined as a subject, and the lens focal length is adjusted according to the position information, and video materials are obtained by continuously shooting from the first side to the second side of the subject; if the pre-composition is determined not to conform to composition rules, the photographing mechanism switches to standby or off mode. The present invention is simple in structure and intelligent, and ensures the subject properly positioned in the images, and the automatic, clear and complete photographing of birds facilitate the observation and recording of bird lovers and scientific researchers.

9 Claims, 10 Drawing Sheets

(56) References Cited

U.S. PATENT DOCUMENTS

| | | | |
|---|---|---|---|
| 2022/0144186 A1* | 5/2022 | Heafitz | G03B 35/18 |
| 2022/0384513 A1* | 12/2022 | Noh | H04N 25/78 |
| 2023/0337638 A1* | 10/2023 | Chang | A61B 5/1072 |
| 2024/0007746 A1* | 1/2024 | Chen | H04N 23/675 |

* cited by examiner

BIRD PHOTOGRAPHING METHOD AND BIRD FEEDER

CROSS-REFERENCE TO RELATED APPLICATIONS

The application claims priority of Chinese patent application CN 202410221757.7, filed on Feb. 28, 2024, which is incorporated herein by reference in its entireties.

TECHNICAL FIELD

The present invention relates to the technical field of bird feeder. In particular, the present invention is directed to a bird photographing method, a readable storage medium, an electronic device and a bird feeder thereof.

BACKGROUND

Bird feeder is a device used to attract and feed birds in the surrounding area, which is highly popular among bird lovers or scientific researchers. The traditional bird feeder only has a feeding tray for placing bird food or feed. Although it can attract birds to peck, it is inconvenient for observing and recording birds, and is easily affected by various objective factors such as time, weather, and venue. The limiting factors make it difficult to capture the desired images at the right time and angle. Therefore, there is an urgent need to overcome the above drawbacks.

SUMMARY

Accordingly, the main object of the present invention is to overcome the above mentioned drawbacks, by providing a bird photographing method, a readable storage medium, an electronic device and a bird feeder thereof, which can automatically, clearly and completely photograph and record birds.

The present invention realizes the above object by the following technical proposal, a bird photographing method, wherein:
  a bird approaching and staying on the feeding tray is detected, the photographing mechanism photographs the bird and judges the pre-composition;
  if the pre-composition is determined as conforming to composition rules, the bird is determined as a subject, whose position information is obtained to adjust the a lens to a matching focal length, and the photographing mechanism continuously shoots from the first side view to the second side view of the subject to obtain video materials;
  if the pre-composition is determined as non-compliance, the photographing mechanism switches to standby or off mode;
  further, the composition rules comprise the Rule of Thirds composition, the symmetrical composition, the diagonal composition, the leading lines composition, the center composition, and the negative space composition;
  further, the steps of determining a bird as a subject further comprise: determining whether the bird is a target subject according to the characteristics of the bird; if yes, the target subject is determined as a photographing subject; if no, the photographing mechanism switches to standby or off mode.
  further, the steps of acquiring the video materials comprise: the drive mechanism driving the photographing mechanism to move along the outer periphery of the feeding tray from the first position to the second position, and the first driver driving the lens toward the subject so that the lens tracks and shoots the subject;
  further, after the steps of acquiring the position information, the method comprises: the drive mechanism driving the photographing mechanism to the first position according to the position information;
  further, after the steps of acquiring the video materials, the method comprises: uploading the video materials to the cloud and/or intelligent terminals, and editing the video materials to deliver final works.

The present invention also provides a bird feeder, wherein:
  a feeding tray for holding bird food is provided to lure the subject to approach and stay;
  a photographing mechanism is provided opposite to the feeding tray to continuously shoot from the first side view to the second side view of the subject;
  a sensing mechanism arranged is provided relative to the feeding tray for detecting and identifying the subject;
  further, a grain feeding mechanism is provided at the bottom of the feeding tray for the purpose of replenishing bird food to the feeding tray, which does not affect the pecking of birds, nor block the lens of the photographing mechanism, ensuring a good field of view for photographing and convenient composition; as a result, optimal images can be obtained which conform to composition rules;
  further, a drive mechanism is provided, and the drive mechanism is set with a photographing mechanism; and the drive mechanism drives the photographing mechanism to move along the outer periphery of the feeding tray from a first position to a second position; the action process of the subject can be photographed and recorded at multiple angles, so as to facilitate details observation by bird lovers and scientific researchers;
  further, the photographing mechanism includes a lens and a first driver; the lens is connected to the output shaft of the first driver, and the first driver drives the lens toward the subject, so as to ensure that the subject always conforms to the composition rules, and complete photographing and recording can be realized with better image effects delivered;
  further, the sensing mechanism may be one or more of a sound sensor, an image sensor, and a pyroelectric sensor, which ensures that the subject can be detected and photographed, so as to avoid missing desired image capturing;
  the present invention further provides a readable storage medium, on which a plurality of instructions are stored, and when the instructions are executed by the processor, any of the above-mentioned bird photographing methods is realized;
  the present invention further provides an electronic device comprising a memory, a processor, and a program stored on the memory and runnable on the processor; when the processor executes the program, any of the above-mentioned bird photographing methods is realized.

The beneficial effect of the present invention are as follows: firstly, by setting the photographing mechanism relative to the feeding tray, the subject can be identified and automatically photographed, which is relatively intelligent and simple in structure, facilitating observation and recording;

secondly, the photographing mechanism can continuously shoot from the first side view to the second side view of the subject, and drive the photographing mechanism to move along outer periphery of the feeding tray from the first position to the second position, so that the action process of the subject can be completely photographed and recorded for the detailed observation of bird lovers and scientific researchers, thereby overcoming obstacles that time, weather, and venue and other objective factors may hinder photographing and recording;

thirdly, the pre-composition of photographing is judged to enable the subject captured in images conforming to composition rules, which delivers a better photography effect, a higher level of aesthetic beauty, quality-guaranteed video materials and fewer rejected works, and reduces the workload for subsequent editing, and speeds up the acquisition of final works;

fourthly, by controlling the operation of the first driver, the lens can be directed towards the subject, so that the lens can always locate the subject, ensuring that the subject is always in a proper position in the image captured, and the lens can be adjusted to a focal length matching the position information of the subject, so that the subject can be photographed and recorded clearly and completely, overcoming the technical drawbacks of prior art. In summary, the present invention has the advantages of simple structure and relative intelligence, can always properly place subjects in images according to composition rules, and the subject can be clearly and completely photographed and recorded automatically, so as to facilitate the observation and record of bird lovers and scientific researchers.

Markings to the drawings are as follows: 1—Feeding tray; 11—Air hole;
2—Photographing mechanism; 21—Lens; 22—Motion sensor; 23—The first driver; 24—Fill light;
3—Power supply mechanism;
4—Food supply mechanism; 41—Grain storage cylinder; 411—Connecting outlet; 42—Pushing piece; 43—The second driver; 44—Sealing plate; 45—Mounting bracket;
5—Annular conical table;
6—One-way opening and closing mechanism; 601—Supporter; 6011—Sliding hole; 602—Cover plate; 6021—Slide bar; 603—Stop block;
611—Diverter cylinder; 6111—Grain outlet; 612—One-way door; 613—Stopper rim;
7—Stand;
8—Drive mechanism; 801—Mounting frame; 8011—Suspension ring; 802—Connecting plate; 803—The third driver; 804—The first gear; 805—The first gear ring;
811—Active block; 812—The fourth driver; 813—The second gear ring; 814—The second gear;
821—Connecting block; 822—Guide rail; 8221—Limiting slot; 823—The fifth driver; 824—Driving wheel; 825—Locating block.

EMBODIMENTS

For a fuller understanding of the present invention, the following detailed descriptions are made in connection with the accompanying drawings and specific embodiments. It should be noted that when an element is expressed as "fixed" to another element, it may be directly on the other element, or there may be one or more centered elements in between. When an element is expressed as "connected" to another element, it may be directly connected to the other element, or there may be one or more centered elements in between. The terms "up", "down", "left", "right", "inside", "outside" and similar expressions used herein are for illustrative purposes only.

Unless otherwise defined, all technical and scientific terms used herein have the same meanings as those skilled in the art would normally understand. The terms used herein are for the purpose of describing specific embodiments only, not limiting the present invention. The term "and/or" used herein includes any and all combinations of one or more related listed items.

Embodiment 1

Figure 1:
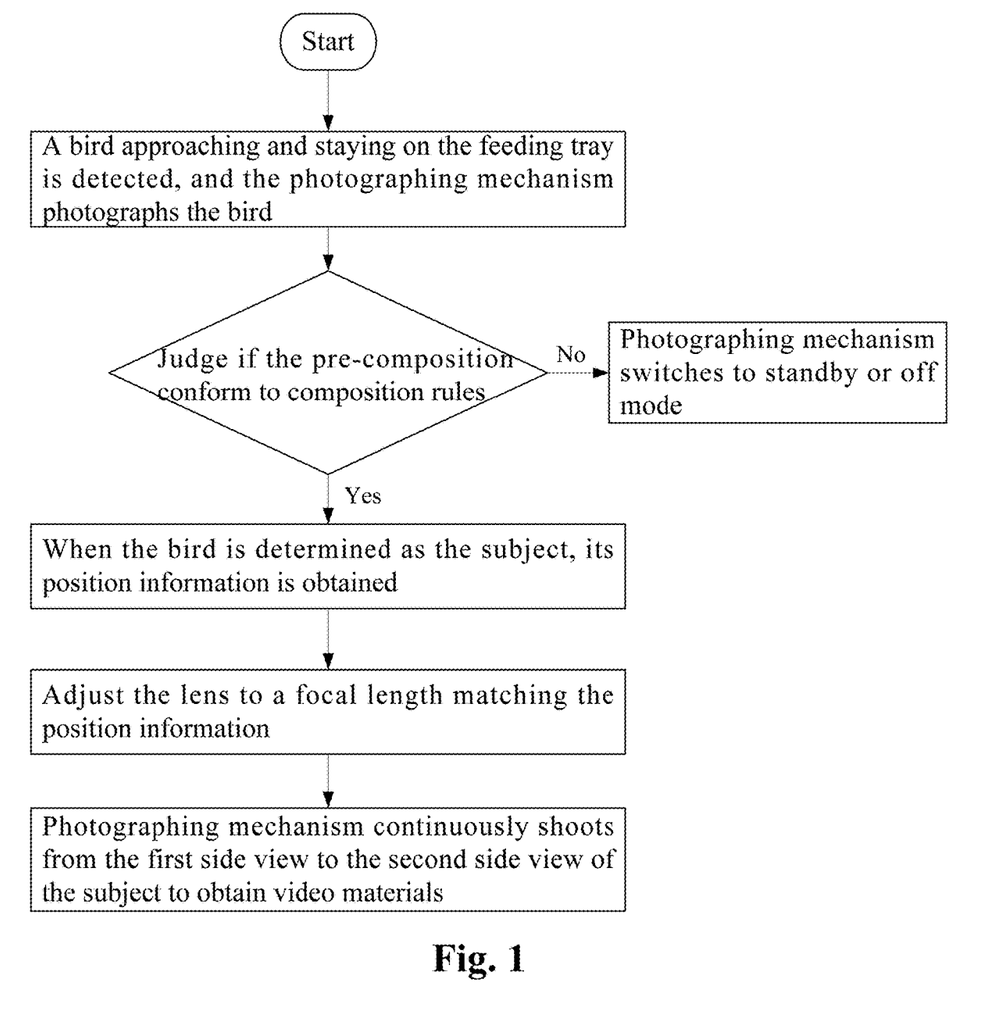
FIG. 1 is a flowchart of the bird photographing method of the present invention.

Referring to FIG. 1, the present embodiment provides a bird photographing method, wherein:

a bird approaching and staying on the feeding tray 1 is detected, the photographing mechanism 2 photographs the bird and judges the pre-composition;

if the pre-composition is determined as conforming to composition rules, the bird is determined as a subject, whose position information is obtained to adjust the lens 21 to a matching focal length, and the photographing mechanism 2 continuously shoots from the first side view to the second side view of the subject to obtain video materials; for the adjustment of the focal length, it can be electronic zoom or optical zoom to meet the clarity of the shooting;

if the pre-composition is determined as non-compliance, the photographing mechanism 2 switches to standby or off mode;

the composition rules comprise the Rule of Thirds composition, the symmetrical composition, the diagonal composition, the leading lines composition, the center composition, and the negative space composition; it should be noted that the Rule of Thirds composition is also called the nine-patch grid composition, in which, two horizontal lines and two vertical lines divide the image equally, and the subject is placed on the four intersections of the lines, or placed on the lines; the symmetrical composition is based on up-down symmetry and left-right symmetry of the subject; the diagonal composition is to arrange the subject in the diagonal position of the image to be captured, showing a diagonal relationship; the leading lines composition is to place the subject along the lines; the center composition is to place the subject in the center of the image; the negative space composition is that the subject in the image is more prominent, and there are fewer other clutter; further, the composition rules may comprise the framing composition, the golden section composition and the radial composition, whose specific descriptions and rules are known to those skilled in the art and are not set out herein; the subject may be a single or a plurality, matching the corresponding composition is matched to the number of birds; the composition rules can be trained with AI intelligent algorithms or big data models, to enable the determination of suitable composition rules; in the actual use, screenshots of a well-composed images are captured and sent to the user's intelligent terminals through the communication module;

the steps of determining the bird as a subject further comprise: determining whether the bird is a target subject according to the characteristics of the bird; if yes, the target subject is determined as a photographing subject; if no, the photographing mechanism 2 switches to standby or off mode; specifically, the subject is firstly determined as a bird or not, which can be realized by the combined image recognition technology according to the characteristics of birds; the characteristics of birds include feather color, feather texture, beak shape, claw shape and other characteristics of birds; after judging as a bird, the bird is simultaneously or further determined as a target subject or not; the setting for subject selection can be set as needed, the characteristics of the target birds can be pre-bound or pre-set, so as to facilitate target subject selection and photographing, such as sparrows, magpies, swallows, etc.;

the steps of acquiring video materials comprise: the drive mechanism 8 driving the photographing mechanism 2 to move along the outer periphery of the feeding tray 1 from the first position to the second position, and the first driver 23 driving the lens 21 toward the subject, so that the lens 21 tracks and shoots the subject;

after the steps of acquiring the position information, the method further comprises: the drive mechanism 8 driving the photographing mechanism 2 to the first position according to the position information; specifically, the subject sometimes inclines to one side and is close to the edge of the image to be captured, not in between the first position and the second position; it is necessary to move the photographing mechanism 2 to the first position, to ensure that during continuous shooting, the subject is always in the best shooting positions that conform to composition rules, and the desired photography effect can be achieved; in the actual scenario, the photography technique is matched to the currently determined composition rule; for example, the photographing surrounding a subject can be realized by the action of the drive mechanism 8; the subject is tracked and photographed, and the lens zooms in or out to always capture the subject; compared to other photography techniques that adopt left-right, up-down, far-near or near-far techniques, the videos obtained by the present technique are up to the standard of a professional photographer, and the final works delivered are more pleasing to the eyes; the settings of the photography technique may include pre-set or pre-bound actions, and pre-compiled control programs, so that photographing can be done accordingly when a certain photography technique is used;

after the steps of acquiring video materials, the method further comprises: uploading the video materials to the cloud and/or intelligent terminals, and editing the video materials to deliver final works; specifically, intelligent terminals may be electronic devices such as mobile phones, computers, tablets, and smart watches; the captured video materials can be used as final works, which can be edited manually or automatically; the automatic editing enables adding text, background blurring, close-up and watermarking; multiple video materials of the same type can be compiled; for example, to compile bird pecking images from a collection of video materials captured on a certain day, the contents of the video materials are firstly recognized, and the pecking images are then cut out and compiled; the pecking images can be pre-set by one or more demos, until the pecking images can be recognized automatically.

Figure 2:
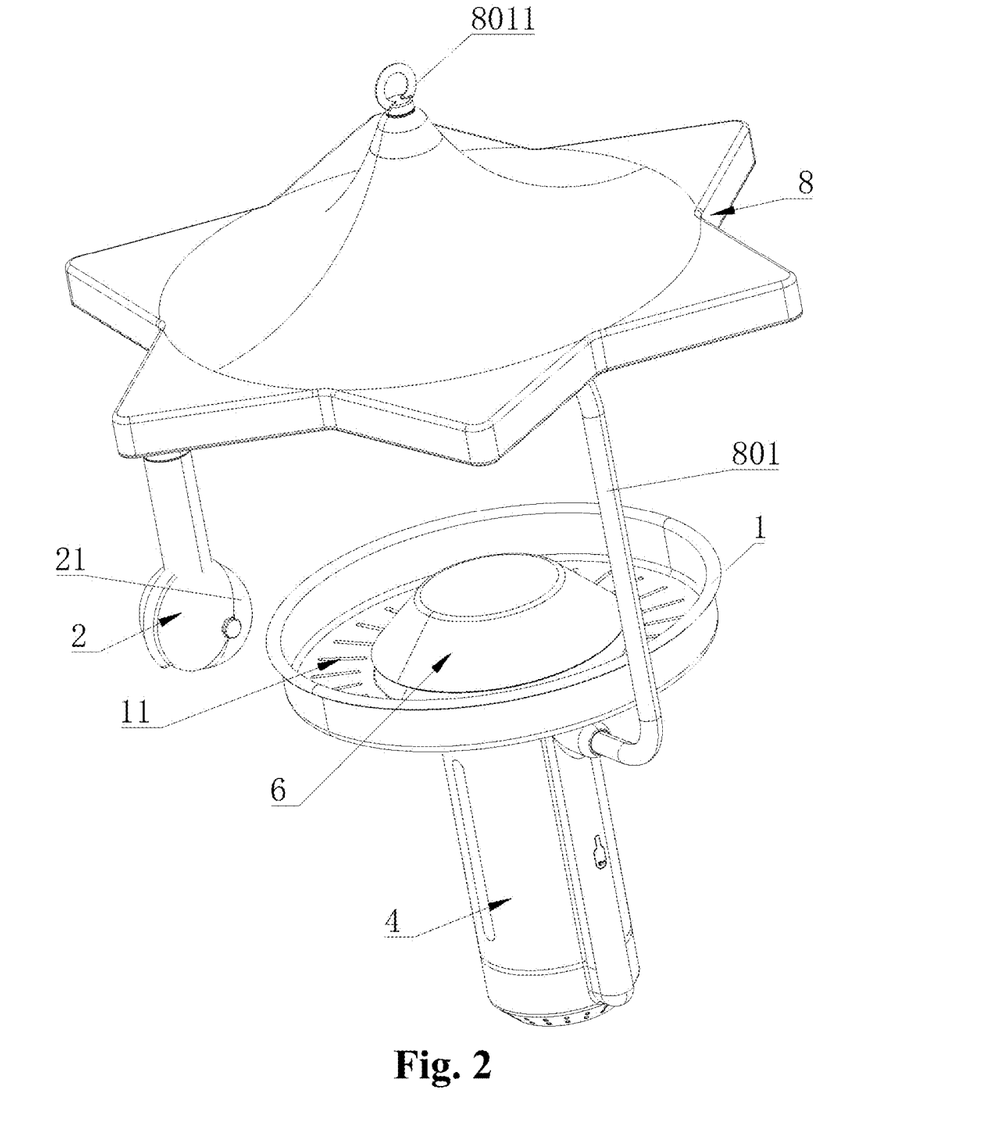
FIG. 2 is an overall structural view of embodiment 1 of the present invention.
Figure 3:
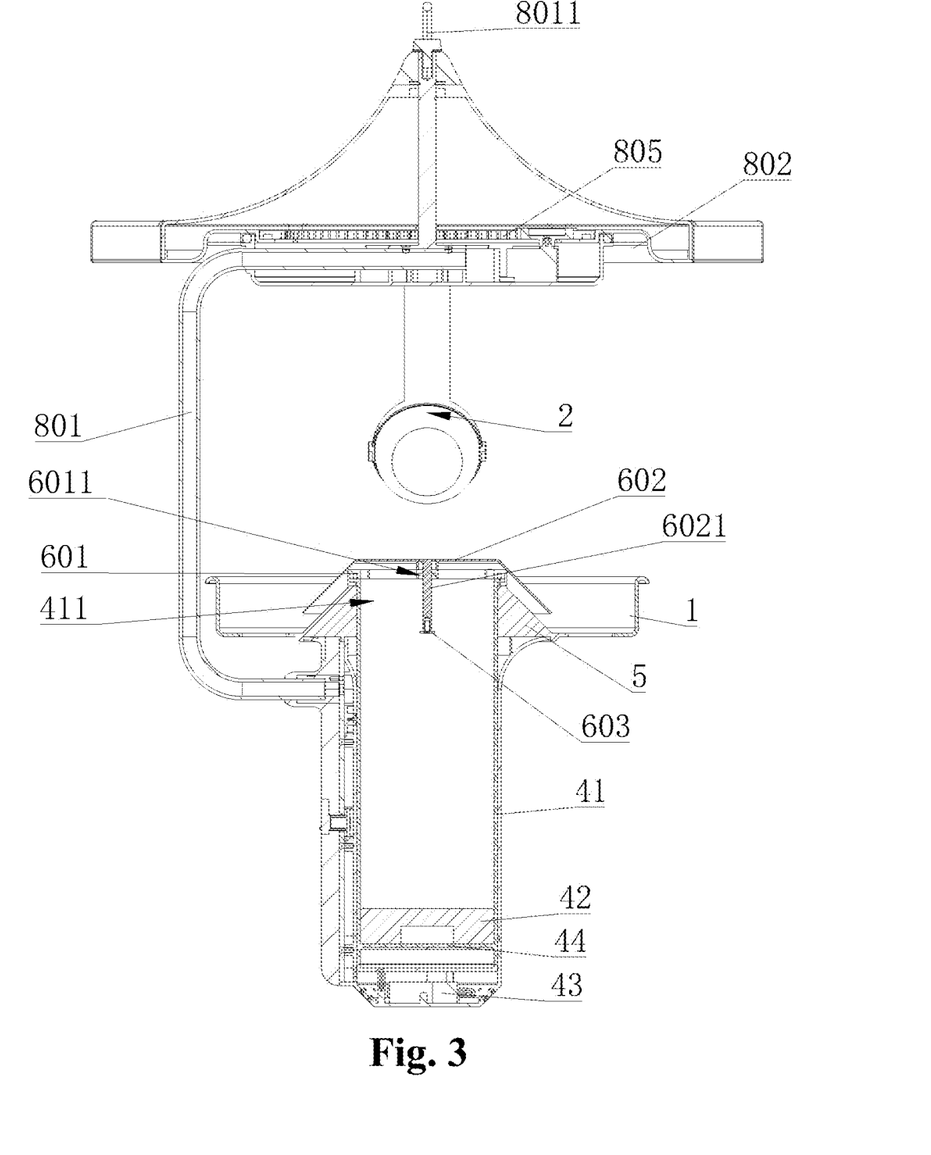
FIG. 3 is an overall cross-sectional view of embodiment 1 of the present invention.
Figure 4:
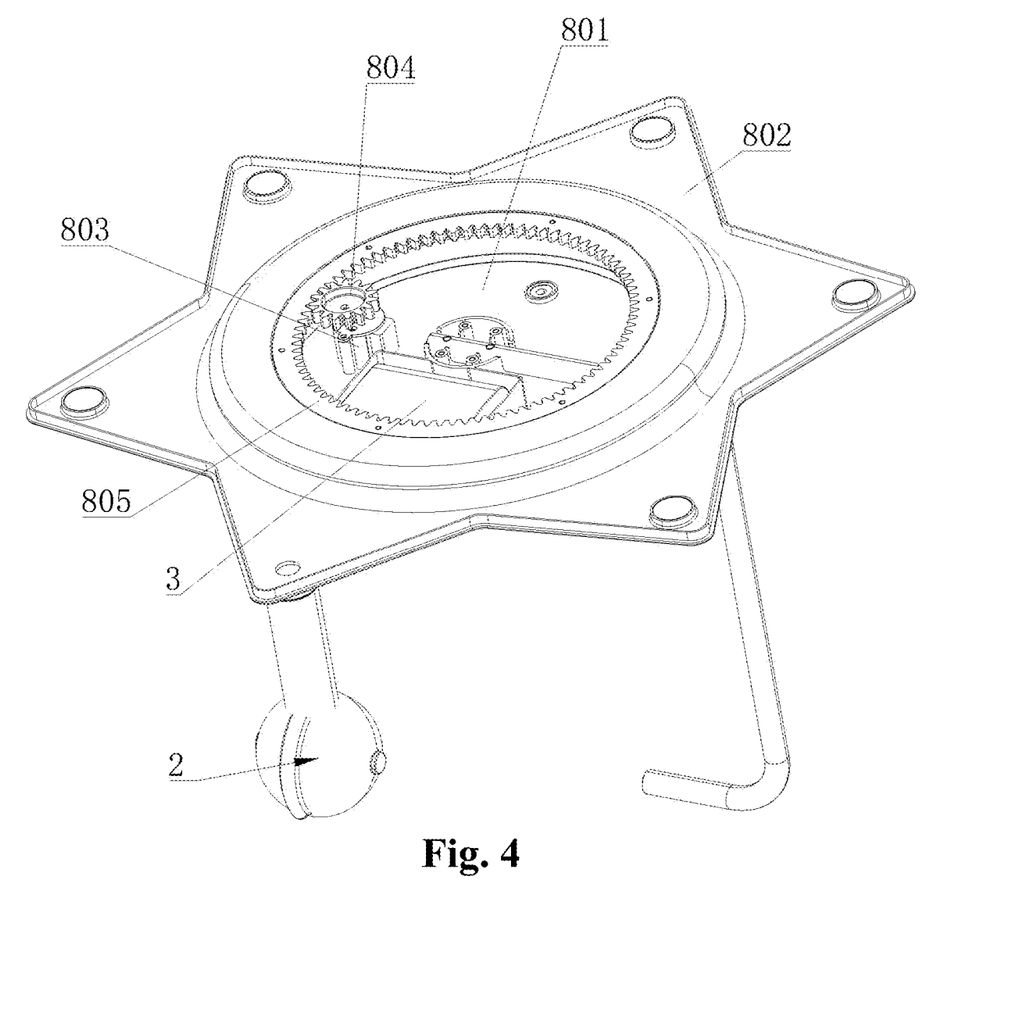
FIG. 4 is a structural view of the drive mechanism of embodiment 1 of the present invention.
Figure 10:
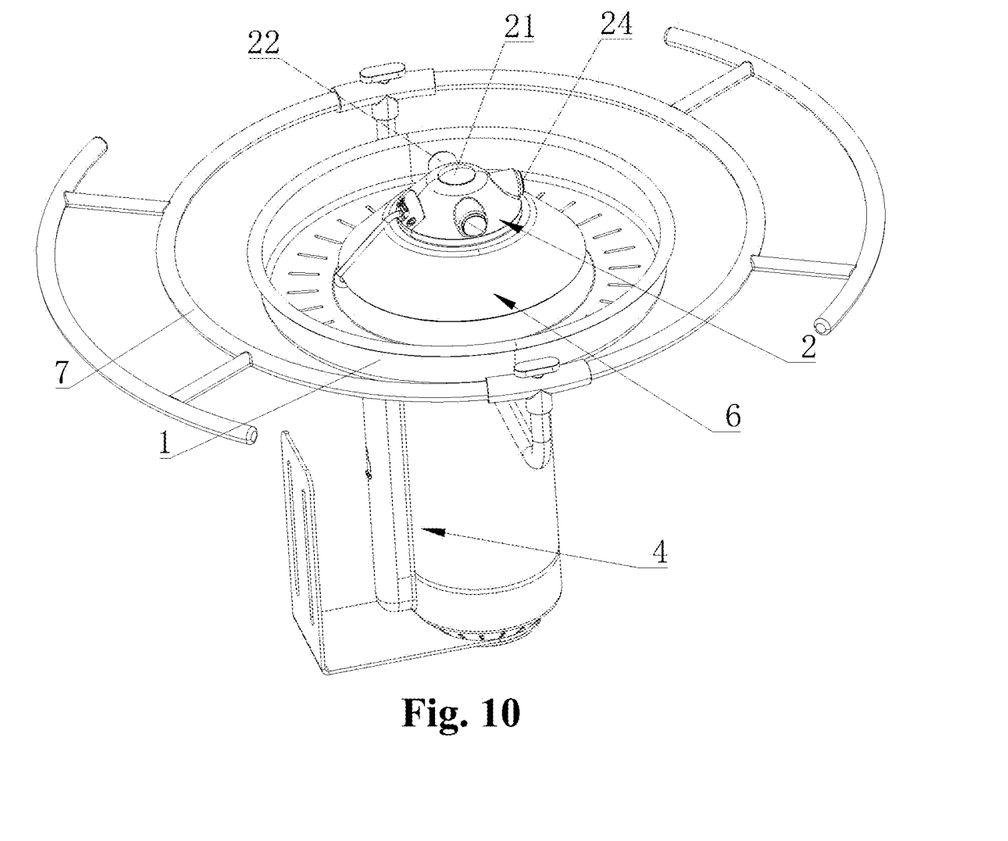
FIG. 10 is a structural view of the photographing mechanism of the present invention.

As shown from FIG. 2 to FIG. 4, the present embodiment further provides a bird feeder, wherein:

a feeding tray 1 for containing bird food is provided to lure the subject to approach and stay;

a photographing mechanism 2 is provided opposite to the feeding tray 1 for continuously shooting from the first side view to the second side view of the subject;

a sensing mechanism is provided opposite to the feeding tray 1 for detecting and identifying the subject; the sensing mechanism may be one or more of sound sensors, image sensors, and pyroelectric sensors; the sensing mechanism in the present embodiment is a motion sensor 22 provided on the photographing mechanism 2; preferably, a PIR sensor is used as a motion sensor 22, which accurately and quickly detects birds; the photographing mechanism may also be provided in a plurality, one of which may be used as an image sensor to identify birds using the image recognition technology; a sound sensor can also be added to pre-input the voiceprint of birds for model training that enables the recognition of various bird chirps; as for the setup of sensors, the larger number of quantities and types serve for higher accuracy of recognition and detection;

the bird feeder is also provided with a power supply mechanism 3 for providing power to the photographing mechanism 2, the food supply mechanism 4 and the drive mechanism 8; the power supply mechanism 3 includes a circuit board and a battery; the battery is preferably an 18650 lithium battery; and the circuit board is provided with a charging interface and an indicator;

a food supply mechanism 4 is provided at the bottom of the feeding tray 1 for replenishing bird food to the feeding tray 1; specifically, the food supply mechanism 4 comprises a grain storage cylinder 41, a pushing piece 42, and a second driver 43; the top end of the grain storage cylinder 41 is provided with a connecting outlet 411, and the feeding tray 1 is provided with a fitting hole communicating with the connecting outlet 411; the pushing piece 42 is provided within the grain storage cylinder 41, the second driver 43 drives and connects to the pushing piece 42, and the second driver 43 is electrically connected to the power supply mechanism 3; in actual operation, the bird food is stored in the grain storage cylinder 41, and when it is necessary to replenish the bird food in the feeding tray 1, the second driver 43 operates to drive the pushing piece 42 to push the bird food from the grain storage cylinder 41 to the connecting outlet 411, so that the bird food falls into the feeding tray 1, thereby realizing the replenishment of bird food; it is worth mentioning that the height of the connecting outlet 411 is higher than that of the fitting hole, so that the top end of the grain storage cylinder 41 protrudes from the feeding tray 1, and an annular conical table 5 is sleeved on the outer periphery of the top end of the grain storage cylinder 41, so that the bird food flowing out of the connecting outlet 411 can diverge to the feeding tray 1 more evenly, without piling up; preferably, the fitting hole is arranged in the center of the feeding tray 1, so as to ensure the evenly grain output; further, a detection mechanism is provided in the grain storage cylinder 41 to detect the stock of bird food inside; the detection mechanism is electrically connected with the intelligent terminal; when the bird food is out of stock, the user is reminded to replenish the stock; when the stock replenished reaches the maximum amount, the user is reminded to stop; a timing program can be set to replenish the bird food, which commands the second driver 43 to act accordingly at a set time point, so as to realize the timed replenishment of bird food to the feeding tray 1; alternatively, the photographing mechanism 2 equipped with image recognition technology can be used to recognize and judge the amount of bird food on the feeding tray 1; usually, when the feeding tray 1 is detected to be or close to be empty, the food supply mechanism 4 is controlled to act and replenish bird food into the feeding tray 1;

referring to FIG. 3, the pushing piece 42 is selected in a shape fit to the inner wall of the grain storage cylinder 41, so that the pushing piece 42 is slidably sealed and connected to the inner wall of the grain storage cylinder 41; the grain storage cylinder 41 is divided into an upper cavity and a lower cavity; the bird food is stored in the upper cavity, the second driver 43 is arranged in the lower cavity; the second driver 43 preferably is adopted with an air pump, and the end of the lower cavity is sealed with a sealing plate 44; and air is filled between the sealing plate 44 and the pushing piece 42 through the second driver 43, so that the pushing piece 42 can slide upward and away from the sealing plate 44; as a result, the bird food in the upper cavity can be pushed out from the connecting outlet 411; normally, the air between the sealing plate 44 and the pushing piece 42 is discharged to allow the pushing piece 42 to go against the sealing plate 44, so that the bird food does not always accumulate at the connecting outlet 411, preventing birds from directly pecking the bird food in the grain storage cylinder 41;

referring to FIG. 3, the connecting outlet 411 is provided with an one-way opening and closing mechanism 6 which normally closes the connecting outlet 411; when the food supply mechanism 4 works and the bird food needs to be replenished, in the process of the bird food pushed upward, the one-way opening and closing mechanism 6 can be pushed open, so that the bird food falls into the feeding tray 1 smoothly; specifically, the one-way opening and closing mechanism 6 includes a supporter 601 connected to the connecting outlet 411; the supporter 601 is slidably connected to a cover plate 602 and provided with a sliding hole 6011; the cover plate 602 is protruded with a slide bar 6021 that slides and cooperates with the sliding hole 6011; the slide bar 6021 is provided along the axial extension of the connecting outlet 411, and the end of the slide bar 6021 is provided with a stop block 603 that stops and cooperates with the supporter 601, and the diameter of the cover plate 602 is greater than that of the connecting outlet 411; under normal circumstances, the cover plate 602 closes the connecting outlet 411 under the action of gravity, which can prevent birds from accessing bird food in the grain storage cylinder 41; when the bird food is pushed upward, the cover plate 602 is pushed upward, and the slide bar 6021 slides relative to the sliding hole 6011, until the stop block 603 is against the supporter 601, and the bird food can flow out of the connecting outlet 411 smoothly to replenish the feeding tray 1;

the outer periphery of the feeding tray 1 is provided with a stand 7; the feeding tray 1 is preferably in the shape of a disc, which features a simple structure convenient for manufacturing, reduces manufacturing costs, and is durable; it may also be in triangular, square, rectangular, arc, special shapes or other shapes, which can be selected or manufactured according to actual needs, and are not set out in details herein; a plurality of air holes 11 are provided on the bottom surface of the feeding tray 1, so that the contained bird food can always stay dry and spoilage can be avoided; the stand 7 is fixedly connected to the feeding tray 1 and/or the grain storage cylinder 41, and the stand 7 is preferably in an annular shape, or may be a semi-annular shape, or its arc length may be set according to the actual needs; the stand 7 may also be single-layered or multi-layered; in the case of a multi-layered stand, the stand is generally concentrically arranged, so as to accommodate more birds;

the bird feeder further comprises a drive mechanism 8, on which a photographing mechanism 2 is provided; the drive mechanism 8 drives the photographing mechanism 2 to move from a first position to a second position along the outer periphery of the feeding tray 1; specifically, as shown in FIG. 4, the drive mechanism 8 comprises a mounting frame 801, a connecting plate 802, and a third driver 803; the mounting frame 801 is fixedly connected to the feeding tray 1 and/or the grain storage cylinder 41; the connecting plate 802 is rotatably connected to the mounting frame 801, and the photographing mechanism 2 is set on the connecting plate 802; the third driver 803 is provided on the mounting frame 801, and the output shaft of the third driver 803 is connected to a first gear 804; and the connecting plate 802 is provided with a first gear ring 805 engaged with the first gear 804; and the axis of the first gear ring 805 is preferably provided coaxially with the center line of the feeding tray 1; the third driver 803 is preferably a motor; when the third driver 803 operates, it drives the first gear 804 to rotate; the cooperation between the first gear 804 and the first gear ring 805 drives the connecting plate 802 to rotate relative to the mounting frame 801, so that the photographing mechanism 2 is moved along the outer periphery of the feeding tray 1; preferably, the mounting frame 801 is C-shaped, so that the drive mechanism 8 is located above the feeding tray 1; and the mounting frame 801 is provided with a suspension ring 8011, and a mounting bracket 45 or other connection structure may be provided on the grain storage cylinder 41 to facilitate the hook-up of the bird feeder in a suitable place;

referring to FIG. 10, the photographing mechanism 2 comprises a lens 21 and a first driver 23; the lens 21 is connected to the output shaft of the first driver 23, and the first driver 23 drives the lens 21 towards the subject; specifically, the photographing mechanism 2 may be arranged in the center of the feeding tray 1 and mounted on the cover plate 602 or the diverter cylinder 611; in this arrangement, the lens 21 is preferably a fisheye camera, and one 180° fisheye camera alone enables panoramic shooting without the drive mechanism 8; to realize continuous shooting from the first side view to the second side view of the subject, the 180° fisheye camera satisfies based on its working principles, and the images of the above range can be cut out through a program; alternatively, two, three, or more lenses 21 may be provided, and a corresponding number may be set in the circumferential direction according to the actual angle range of the lens 21, so as to capture a panoramic view of the feeding tray 1; when the photographing mechanism 2 is provided on the outer periphery of the feeding tray 1, the drive mechanism 8 is usually required, the lens 21 may be selected and installed as needed; and the overall shape of the photographing mechanism 2 simulates a bird, so as to avoid frightening the subject during movement; the photographing mechanism 2 generally further comprises a fill light 24 to ensure the effect of photographing;

the present invention further provides a readable storage medium, on which a plurality of instructions are stored, and when the instructions are executed by the processor, any of the above-mentioned bird photography techniques can be realized; the readable storage medium includes USB flash disk, a mobile hard disk, Read-Only Memory (ROM), Random Access Memory (RAM), magnetic disk or optical disk and other media that can store program codes;

the present invention further provides an electronic device comprising a memory, a processor, and a program stored on the memory and runnable on the processor; when the processor executes the program, any of the above-mentioned bird photographing method can be realized.

Embodiment 2

Figure 5:
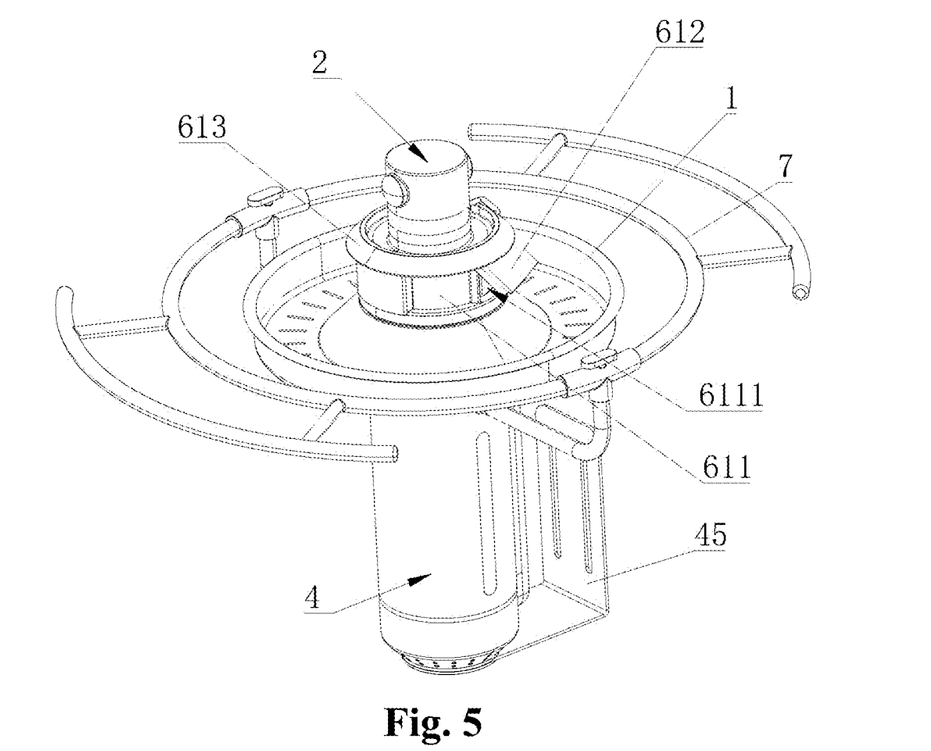
FIG. 5 is an overall structural view of embodiment 2 of the present invention.

Referring to FIG. 5, in the present embodiment, the one-way opening and closing mechanism 6 comprises a diverter cylinder 611 connected to the connecting outlet 411; a plurality of grain outlets 6111 are provided in the circumferential direction on the side wall of the diverter cylinder 611, and a plurality of one-way doors 612 corresponding to the plurality of grain outlets 6111 are provided on the diverter cylinder 611; the top end of the one-way door 612 is rotatably connected with the diverter cylinder 611, and the bottom end of the one-way door 612 stops and cooperates with the outer side of the diverter cylinder 611; the top of the diverter cylinder 611 is provided with a stopper rim 613, whose diameter is larger than that of the diverter cylinder 611, so as to shield the grain outlet 6111 from wind and rain, prevent liquids or impurities from entering the grain storage cylinder 41, and prevent the bird food in the grain storage cylinder 41 from deteriorating quickly; under normal circumstances, the one-way door 612 closes the grain outlet 6111 under the action of gravity, which can also prevent birds from accessing bird food in the grain storage cylinder 41; when the bird food is pushed upward, the bird food passes through the connecting outlet 411 and flows to the grain outlet 6111, so that the one-way door 612 is pushed opened to allow for bird food flowing out, and the bird food can be replenished to the feeding tray 1 smoothly.

Embodiment 3

Figure 6:
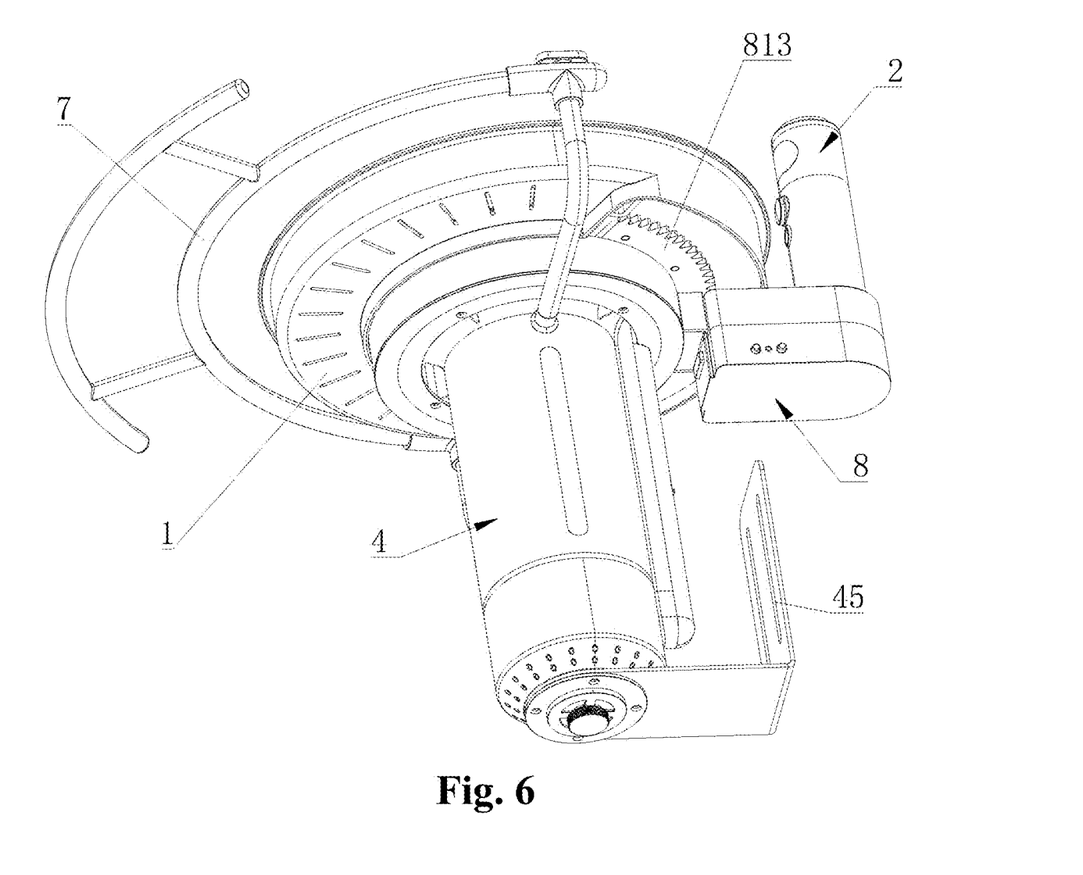
FIG. 6 is an overall structural view of embodiment 3 of the present invention.
Figure 7:
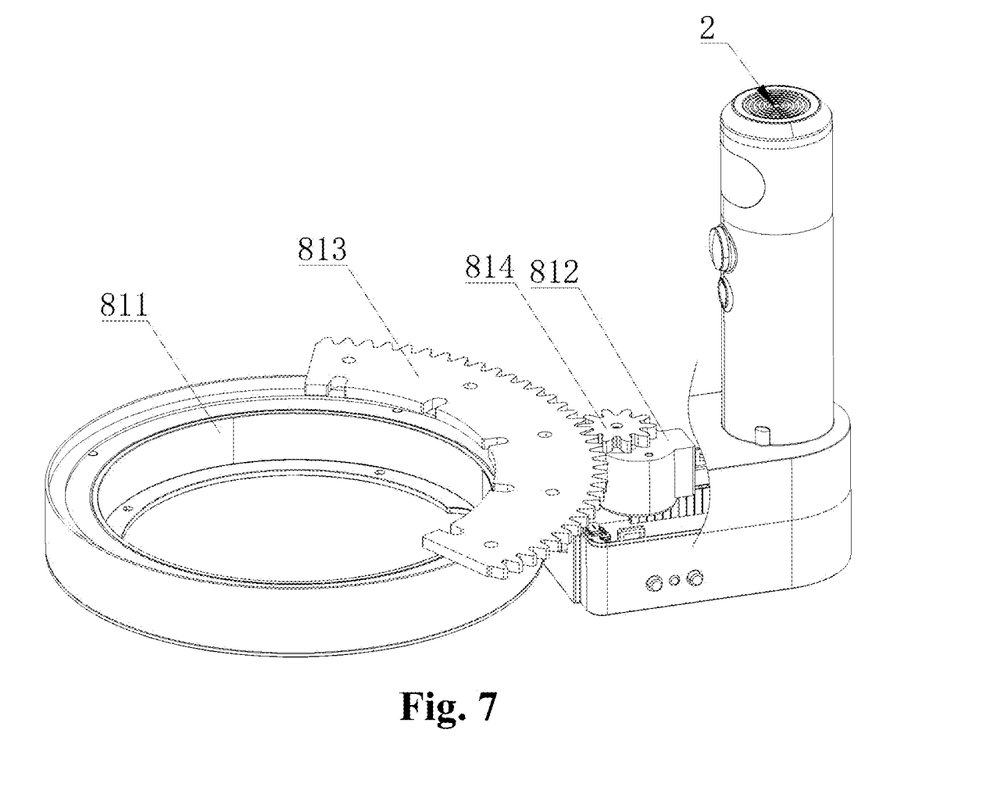
FIG. 7 is a structural view of the drive mechanism of embodiment 3 of the present invention.

Referring to FIG. 6 and FIG. 7, in the present embodiment, the drive mechanism 8 comprises an active block 811, a fourth driver 812 and a second gear ring 813; the active block 811 is rotatably sleeved on the grain storage cylinder 41, the fourth driver 812 and the photographing mechanism 2 are both mounted on the active block 811; the second gear ring 813 is provided at the bottom of the feeding tray 1, and the output shaft of the fourth driver 812 is connected to a second gear 814 engages with the second gear ring 813; the fourth driver 812 preferably is a motor; the fourth driver 812 drives the second gear 814 to rotate, and the cooperation between the second gear 814 and the second gear ring 813 drives the active block 811 to rotate relative to the second gear ring 813, so that the photographing mechanism 2 is moved along the outer periphery of the feeding tray 1; it is worth mentioning that the arc lengths of the first gear ring 805 and the second gear ring 813 may be in 360° full-length above the circumferential direction, or may be set according to the actual needs.

Embodiment 4

Figure 8:
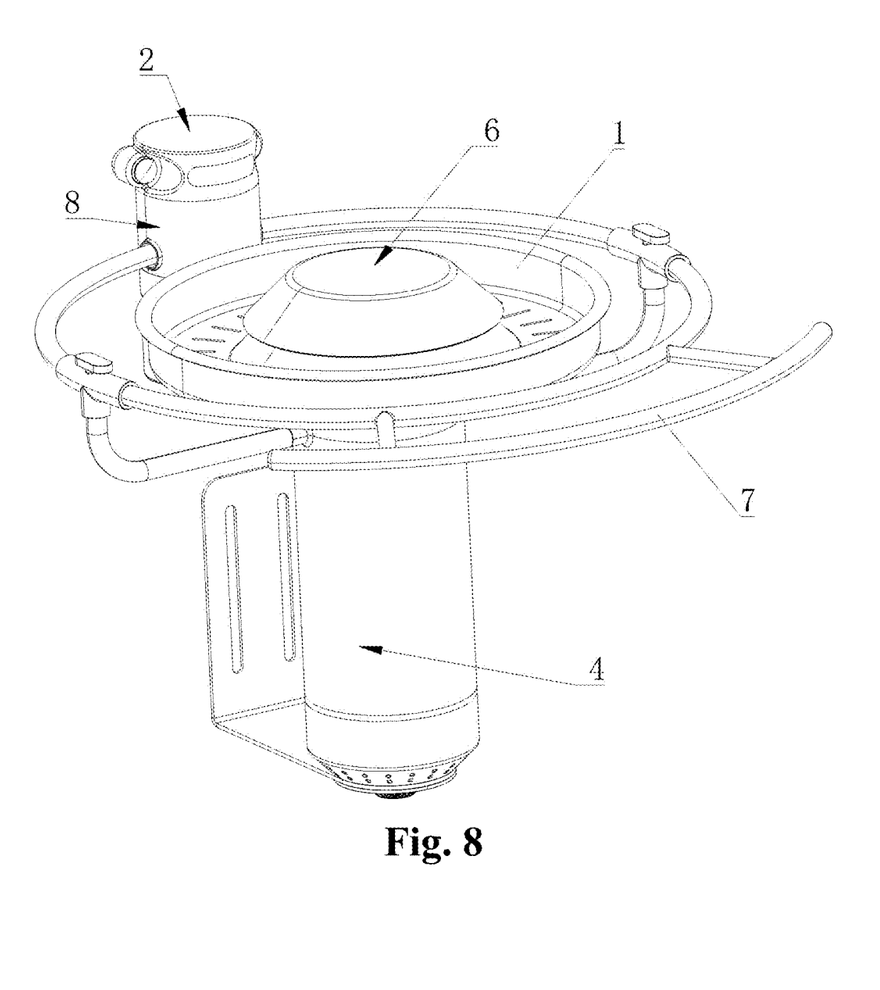
FIG. 8 is an overall structural view of embodiment 4 of the present invention.
Figure 9:
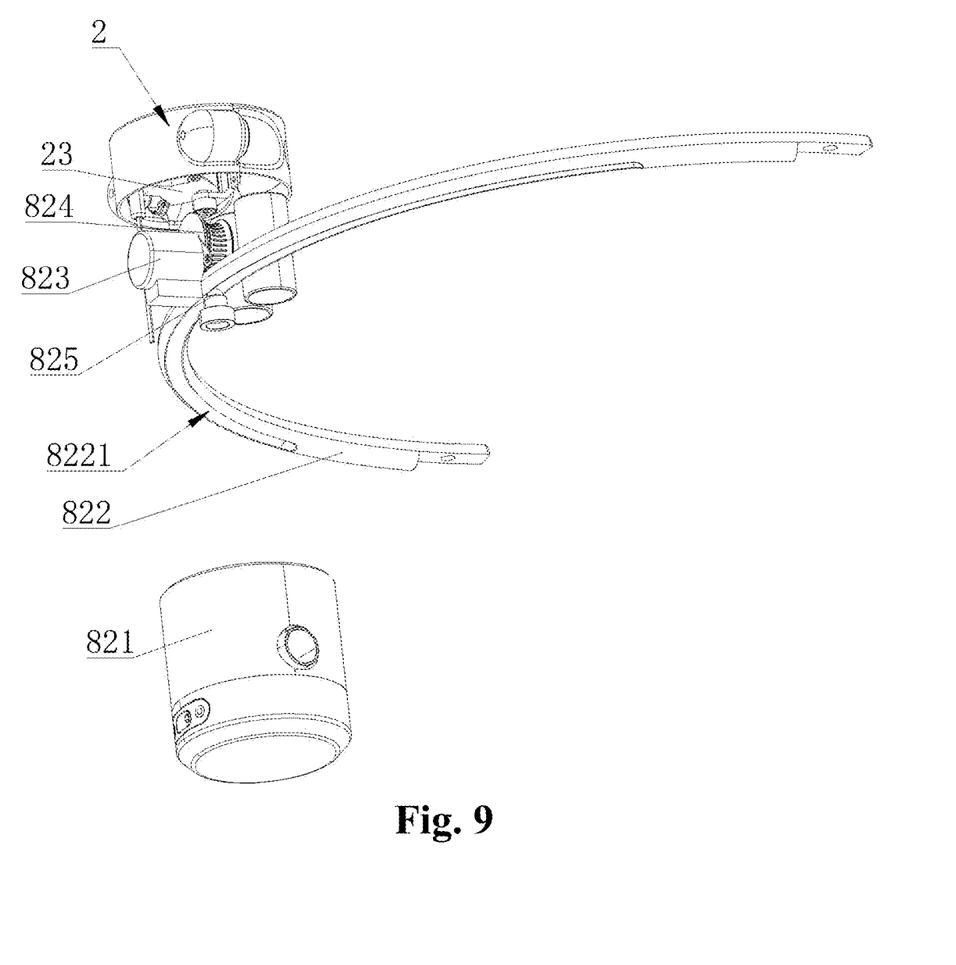
FIG. 9 is a structural view of the drive mechanism of embodiment 4 of the present invention.

Referring to FIG. 8 and FIG. 9, in the present embodiment, the drive mechanism 8 comprises a connecting block 821, a guide rail 822 and a fifth driver 823; the guide rail 822 is fixedly connected to the feeding tray 1 and/or the grain storage cylinder 41; the guide rail 822 is provided along the outer periphery of the feeding tray 1, and the connecting block 821 is slidably sleeved with the guide rail 822; the fifth driver 823 and the photographing mechanism 2 are both provided on the connecting block 821, and the output shaft of the fifth driver 823 is connected to a driving wheel 824; the cross-section of the guide rail 822 is circular, the peripheral surface of the driving wheel 824 is arranged against the guide rail 822 and provided with an annular groove adapted to the guide rail 822; and a plurality of raised dots or raised lines are provided on the annular groove to increase the contact area and ensure the driving force; preferably, a limiting slot 8221 is provided on the guide rail 822 in its extension direction; a locating block 825 is floatably connected to the connecting block 821, and the locating block 825 is clamped into the limiting slot 8221, so that the connecting block 821 can only slide relative to the guide rail 822, other than rotate relative to the guide rail 822, which may cause tipping or skewing; the fifth driver 823 preferably is a motor; the fifth driver 823 drives the driving wheel 824 to rotate, and the cooperation between the driving wheel 824 and the guide rail 822 drives the connecting block 821 to move along the guide rail 822, so that the photographing mechanism 2 moves along the outer periphery of the feeding tray 1.

Although the present invention has been described in language that is specific to certain principles, characteristics and advantages, it is to be understood by persons skilled in the art that the present invention is not limited to what has been particularly shown and described hereinabove; but on the contrary, it is intended to cover such alternatives, modifications and equivalents of the present invention, without departing from the spirit and scope thereof, and the present invention resides in the claims hereinafter appended.

What is claimed is:

1. A bird photographing method, wherein:
   a bird approaching and staying on a feeding tray (1) is detected, and a photographing mechanism (2) photographs the bird and determines pre-composition;
   if the pre-composition is determined to conform to composition rules, the bird is determined as a subject, whose position information is obtained to adjust a lens (21) to a matching focal length, for the adjustment of the focal length, it can be electronic zoom or optical zoom to meet the clarity of the shooting,
   the photographing mechanism (2) continuously shoots from a first side view to a second side view of the subject to obtain video materials, wherein the steps of acquiring the video materials comprise: a drive mechanism (8) driving the photographing mechanism (2) to move along the outer periphery of the feeding tray (1) from a first position to a second position, and a first driver (23) driving the lens (21) toward the subject so that the lens (21) tracks and shoots the subject;
   the drive mechanism (8) is located above the feeding tray (1);
   if the pre-composition is determined not to conform to the composition rules, the photographing mechanism (2) switches to standby or off mode.

2. The bird photographing method of claim 1, wherein the composition rules comprise Rule of Thirds composition, symmetrical composition, diagonal composition, leading lines composition, center composition and negative space composition.

3. The bird photographing method of claim 1, wherein the steps of determining the bird as a subject comprise: determining whether the bird is a target subject according to the characteristics of the bird; if yes, the target subject is determined as a photographing subject; if no, the photographing mechanism (2) switches to standby or off mode.

4. The bird photographing method of claim 1, wherein, after the steps of acquiring the position information, the drive mechanism (8) drives the photographing mechanism (2) to the first position according to the position information.

5. The bird photographing method of claim 1, wherein, after the steps of acquiring the video materials, the method further comprises: uploading the video materials to cloud and/or intelligent terminals, and editing the video materials to deliver final works.

6. A bird feeder comprising:
   a feeding tray (1) for containing bird food to lure subject of photographing to approach and stay;
   a photographing mechanism (2) arranged opposite to the feeding tray (1) for continuously shooting from a first side view to a second side view of the subject,
   further comprising a drive mechanism (8), wherein the photographing mechanism (2) is provided on the drive mechanism (8), and the drive mechanism (8) drives the photographing mechanism (2) to move along the outer periphery of the feeding tray (1) from a first position to a second position;
   the drive mechanism (8) is located above the feeding tray (1);
   a sensing mechanism arranged relative to the feeding tray (1) for detecting and identifying the subject, if the pre-composition is determined to conform to composition rules, the bird is determined as a subject, whose position information is obtained to adjust a lens (21) to a matching focal length, for the adjustment of the focal length, it can be electronic zoom or optical zoom to meet the clarity of the shooting.

7. The bird feeder of claim 6, wherein a food supply mechanism (4) is provided at the bottom of the feeding tray (1), and the food supply mechanism (4) is used for replenishing the feeding tray (1) with bird food.

8. The bird feeder of claim 6, wherein the photographing mechanism (2) comprises a lens (21) and a first driver (23); and the lens (21) is connected to the output shaft of the first driver (23), and the first driver (23) drives the lens (21) towards the subject.

9. The bird feeder of claim 6, wherein the sensing mechanism may be one or more of a sound sensor, an image sensor, and a pyroelectric sensor.

* * * * *